(12) United States Patent
Mao

(10) Patent No.: US 7,839,329 B2
(45) Date of Patent: Nov. 23, 2010

(54) POSITIONING SYSTEM AND METHOD THEREOF

(75) Inventor: Jen-Hao Mao, Sinjhuang (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/827,239

(22) Filed: Jun. 30, 2010

(65) Prior Publication Data

US 2010/0265126 A1 Oct. 21, 2010

Related U.S. Application Data

(62) Division of application No. 11/849,462, filed on Sep. 4, 2007.

(51) Int. Cl.
*G01S 19/49* (2010.01)
*G01C 21/00* (2006.01)

(52) U.S. Cl. .................................. 342/357.32; 701/216

(58) Field of Classification Search ............ 342/357.32; 701/216
See application file for complete search history.

(56) References Cited

U.S. PATENT DOCUMENTS

| | | | |
|---|---|---|---|
| 5,902,351 A | 5/1999 | Streit et al. | |
| 5,995,023 A * | 11/1999 | Kreft | 340/995.25 |
| 6,240,367 B1 | 5/2001 | Lin | |
| 6,597,987 B1 | 7/2003 | Barton | |
| 6,915,205 B2 * | 7/2005 | Kim et al. | 701/207 |

* cited by examiner

*Primary Examiner*—Gregory C Issing
(74) *Attorney, Agent, or Firm*—Thomas, Kayden, Horstemeyer & Risley

(57) ABSTRACT

The invention provides a positioning system. In one embodiment, the positioning system comprises a Global Navigation Satellite System (GNSS) module, a dead reckoning module, a Geographic Information System (GIS) module, and an calculating module. The GNSS module generates a first positioning data according to satellite communication. The dead reckoning module estimates a second positioning data according to a sensor's measurement data, the first positioning data, and a feedback positioning data of a previous epoch. The GIS module fits the first positioning data to a map to generate a third positioning data taken as a final output of the positioning system. The calculating module integrates the third positioning data and the second positioning data according to predetermined weights to obtain the feedback positioning data of a current epoch, which is recursively fed back to the dead reckoning module for a next estimation.

8 Claims, 4 Drawing Sheets

POSITIONING SYSTEM AND METHOD THEREOF

CROSS REFERENCE TO RELATED APPLICATIONS

This application is a divisional of pending U.S. patent application Ser. No. 11/849,462, filed Sep. 4, 2007, the entirety of which is incorporated by reference herein.

BACKGROUND OF THE INVENTION

1. Field of the Invention

The invention relates to Global Navigation Satellite Systems (GNSS), and more particularly to GNSS combined with dead reckoning system and Geographic Information System (GIS).

2. Description of the Related Art

GNSS is the standard generic term for satellite navigation systems that provide autonomous geo-spatial positioning with global coverage. GNSS is also known as Global Positioning System (GPS) in the United States. A GNSS receiver determines its location comprising longitudes, latitudes, and altitudes according to radio signals transmitted from satellites. A GNSS receiver also calculates the precise time. Thus, a device comprising a GNSS receiver can easily obtain precise positioning data. For example, a driver can easily lead his car to destination according to navigation instruction of a GNSS device.

A GNSS device also has disadvantages. A few factors determines the quality of satellites communications. The number of visible satellites in the sky determines the receiving quality of GNSS signals. Weather conditions and signal receiving environments also greatly affect the quality of satellite communication. Because a GNSS receiver determines its location according to radio signals sent by satellites, the GNSS receiver cannot generate positioning data when satellite communication fails. For example, when a car enters a tunnel, the receiving environment of the tunnel blocks the GNSS radio signals, and a GNSS device in the car cannot generate positioning data according to the GNSS signals.

To determine a location when a GNSS device fails, a dead reckoning device is introduced in place of the GNSS device to temporarily estimate the location. A dead reckoning device measures measurement thereof to estimate a location thereof. The dead reckoning device may be an accelerometer measuring acceleration, an odometer measuring moving distance, or a gyro measuring angular rate (compass measuring absolute angles). The location estimation of a dead reckoning device, however, has greater errors and is usable only for a short period.

To solve the problem, the invention provides a positioning system which comprises a GNSS module, a dead reckoning module, and a GIS module. The GIS module improves the precision of positioning data generated by the GNSS module and the dead reckoning module. Thus, the positioning system provides a location information with smaller error and can be used longer when the GNSS system fails.

BRIEF SUMMARY OF THE INVENTION

The invention provides a positioning system. In one embodiment, the positioning system comprises a Global Navigation Satellite System (GNSS) module, a dead reckoning module, a GIS module, and a calculating module. The GNSS module generates a first positioning data according to satellite communication. The dead reckoning module estimates a second positioning data according to a measurement data, the first positioning data, and a feedback positioning data of a previous epoch. The GIS module fits the first positioning data to a map to generate a third positioning data taken as a final output of the positioning system. The calculating module uses the third positioning data and the second positioning data according to predetermined weights to obtain the feedback positioning data of a current epoch, which is recursively fed back to the dead reckoning module for a next estimation.

The invention provides another positioning system. In one embodiment, the positioning system comprises a Global Navigation Satellite System (GNSS) module, a dead reckoning module, an calculating module, and a GIS module. The GNSS module generates a first positioning data according to satellite communication. The dead reckoning module estimates a second positioning data according to a measurement data, the first positioning data, and a feedback positioning data of a previous epoch. The calculating module integrates the first positioning data and the second positioning data according to predetermined weights to obtain a third positioning data. The GIS module fits the third positioning data to a map to generate the feedback positioning data of a current epoch, which is taken as a final output of the positioning system and recursively fed back to the dead reckoning module for a next estimation.

The invention further provides another positioning system. In one embodiment, the positioning system comprises a Global Navigation Satellite System (GNSS) baseband processor, a dead reckoning sensor, a Kalman filter, and a GIS module. The GNSS baseband processor generates a GNSS measurement data according to satellite communication. The dead reckoning sensor generates a measurement data. The Kalman filter estimates a first positioning data according to the sensor's measurement data, the GNSS measurement data, and a second positioning data of a previous epoch. The GIS module fits the first positioning data to a map to generate the second positioning data of a current epoch, which is taken as a final output of the positioning system and recursively fed back to the dead reckoning module for a next estimation.

The invention further provides a method of positioning. First, a GNSS measurement data is generated with a Global Navigation Satellite System (GNSS) baseband processor according to satellite communication. A measurement data is generated with a dead reckoning sensor. A first positioning data is then derived from the sensor's measurement data, the GNSS measurement data, and a feedback positioning data of a previous epoch when the first positioning data is available. The first positioning data is then fitted to a map with a GIS module to generate a second positioning data of a current epoch, which is taken as a final output of the positioning system. Finally, the second positioning data is recursively fed back as the feedback positioning data for derivation of the first positioning data of a next epoch.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
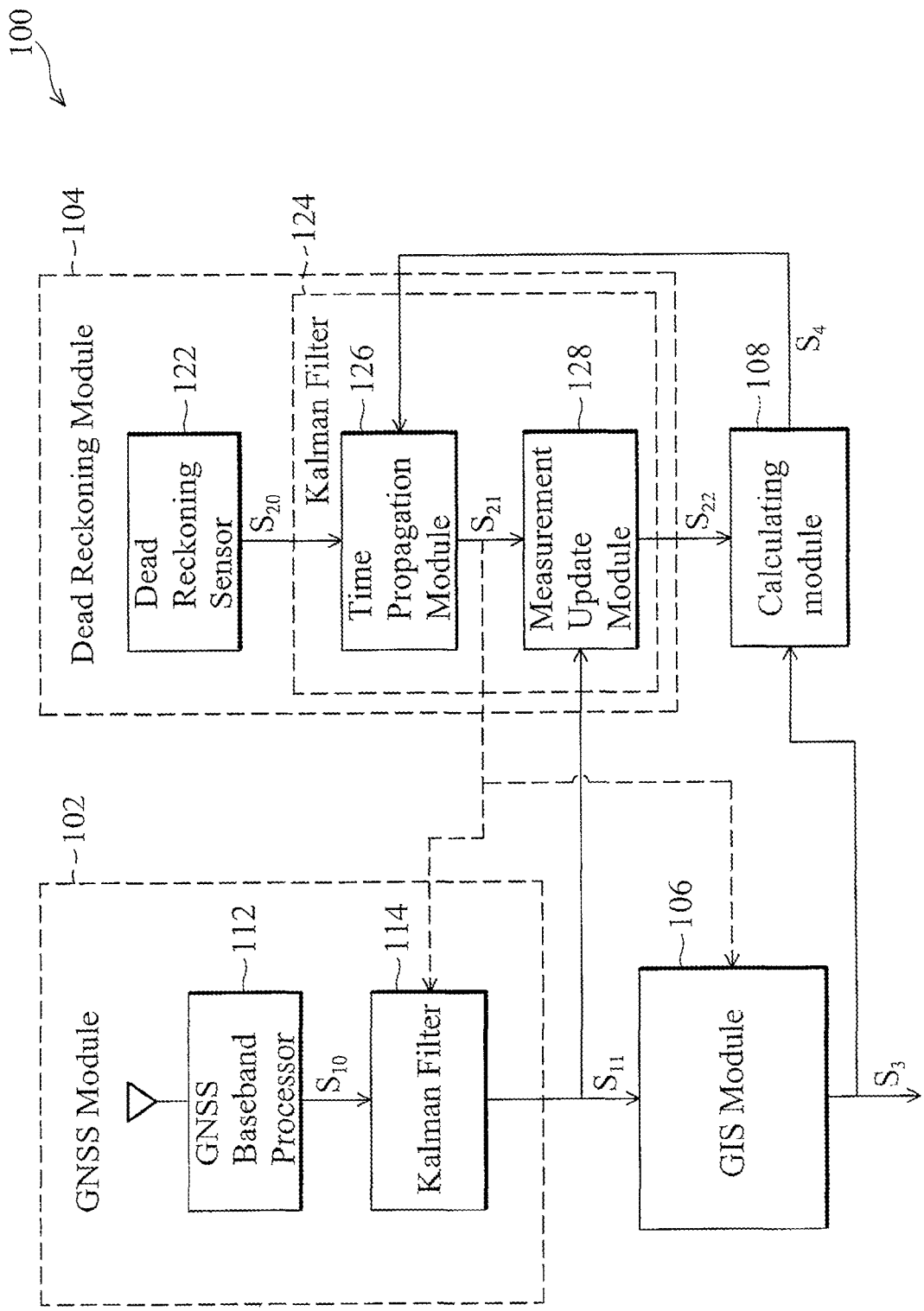
FIG. 1 is a block diagram of a positioning system of a loosely-coupled mode according to the invention.

FIG. 1 is a block diagram of a positioning system 100 according to the invention. The positioning system 100 comprises a GNSS module 102, a dead reckoning module 104, a GIS module 106, and a calculating module 108. The GNSS module 102 detects GNSS signals sent by satellites to generate a positioning data $S_{11}$. In one embodiment, the positioning data $S_{11}$ includes a position data, a velocity data, and a time data. The dead reckoning module 122 detects measurement thereof to generate a positioning data $S_{22}$. The GIS module 106 then adjusts the positioning data $S_{11}$ according to a map data stored therein to obtain a positioning data $S_3$, which is the final output of the positioning system 100. The calculating module 108 then averages the positioning data $S_3$ generated by the GIS module 106 and the positioning data $S_{22}$ generated by the dead reckoning module 104 according to predetermined weights to obtain a positioning data $S_4$ as a feedback to the dead reckoning module 104.

The GNSS module 102 comprises a GNSS baseband processor 112 and a Kalman filter 114. The GNSS baseband processor 112 first generates GNSS measurement data $S_{10}$ according to satellite communication. The Kalman filter 114 then estimates the positioning data $S_{11}$ of a current epoch according to both the GNSS measurement data $S_{10}$ of the current epoch and the positioning data $S_{11}$ of a previous epoch. In one embodiment, the Kalman filter also estimates the positioning data $S_{11}$ according to a positioning data $S_{21}$ provided by the dead reckoning module 104 in addition to the GNSS measurement data $S_{10}$.

The dead reckoning module 104 comprises a dead reckoning sensor 122 and a Kalman filter 124. The dead reckoning sensor 122 generates a measurement data of the positioning system. In one embodiment, the dead reckoning sensor 122 is a linear movement sensor measuring a linear movement to generate the movement data, such as an accelerator measuring acceleration or an odometer measuring a moving distance. In another embodiment, the dead reckoning sensor 122 is an angular movement sensor measuring an angular movement to generate the movement data, such as a gyro measuring angular displacement or a compass measuring absolute angles. In a further embodiment, the dead reckoning sensor 122 is the integration of at least a linear movement sensor and an angular movement sensor.

The Kalman filter 124 comprises a time propagation module 126 and a measurement update module 128. The time propagation module 126 estimates a positioning data $S_{21,T}$ of a current time T according to a feedback positioning data $S_{4,T-1}$ of a previous time (T-1) and a measurement data $S_{20,T}$ of the current time T. Thus, the time propagation module 126 carries out estimation based on a previous estimation data $S_{4,T-1}$. The measurement update module 128 then estimates a positioning data $S_{22,T}$ of the current time T according to the positioning data $S_{21,T}$ of the current time T and the positioning data $S_{11,T}$ of the current time T. Thus, the measurement update module 128 updates the estimation data $S_{21,T}$ of the time propagation module 126 according to the estimation data $S_{11,T}$ generated by the GNSS module 102.

The calculating module 108 generates the positioning data $S_4$ fed back to the time propagation module 126 of the Kalman filter 124 of the dead reckoning module 104 for the estimation of the positioning data $S_{21}$. The positioning data $S_4$ is actually a weighted average of the positioning data $S_3$ generated by the GIS module 106 and the positioning data $S_{22}$ generated by the dead reckoning module 104. Because the positioning data $S_3$ is generated according to the positioning data $S_{11}$ generated by the GNSS module 102 and the precision of the positioning data $S_{11}$ is determined by the quality of GNSS radio signals received from satellites, the precision of the positioning data $S_3$ greatly depends on the quality of satellite communication of the GNSS module 102. Thus, the calculating module dynamically adjusts the weights of the positioning data $S_3$ and the positioning data $S_{22}$ according to the quality of satellite communication of the GNSS module 102 to improve the precision of the positioning data $S_4$.

The quality of satellite communication of the GNSS baseband processor 112 is determined by a few factors such as weather conditions, signal receiving environments, and the number of visible satellites in the sky. When the quality of the satellite communication is too poor for the GNSS baseband processor 112 to generate available GNSS measurement data $S_{10}$, the GNSS module 102 fails and no available positioning data $S_{11}$ is generated. Two modules, the GIS module 106 and the measurement update module 128 require an input of the positioning data $S_{11}$. Thus, when the positioning data $S_{11}$ is unavailable, the measurement update module 128 of the Kalman filter 124 is disabled. In addition, the GIS module 106 receives the positioning data $S_{21}$ as an input instead of the unavailable positioning data $S_{11}$ and directly fits the positioning data $S_{21}$ to a map data to obtain the positioning data $S_3$. Thus, the positioning system 100 can still generate an output positioning data $S_3$ while the GNSS module 102 fails. Because the measurement update module 128 is disabled and no positioning data $S_{22}$ is generated, the calculating module 108 directly outputs the positioning data $S_3$ generated by the GIS module 106 as the positioning data $S_4$ as a feedback to the dead reckoning module 104.

If the Kalman filter 114 of the GNSS module 102 generates the positioning data $S_{11}$ according to both the GNSS measurement data $S_{10}$ and the positioning data $S_{21}$ generated by the time propagation module 126 of the dead reckoning module 104, the Kalman filter 114 can directly generate the positioning data $S_{11}$ according to only the positioning data $S_{21}$ when the GNSS measurement data $S_{10}$ is unavailable. Thus, the GIS module 106 can still fit the positioning data $S_{11}$ to a map data to generate the positioning data $S_3$. Because the positioning data $S_{11}$ is generated according to positioning data $S_{21}$ generated by the dead reckoning module 104, the positioning data $S_{22}$ generated by the measurement update module 128 is of no use due to unavailable measurement data $S_{10}$ and the calculating module 108 directly outputs the positioning data $S_3$ generated by the GIS module 106 as the positioning data $S_4$ as a feedback to the dead reckoning module 104.

Figure 2:
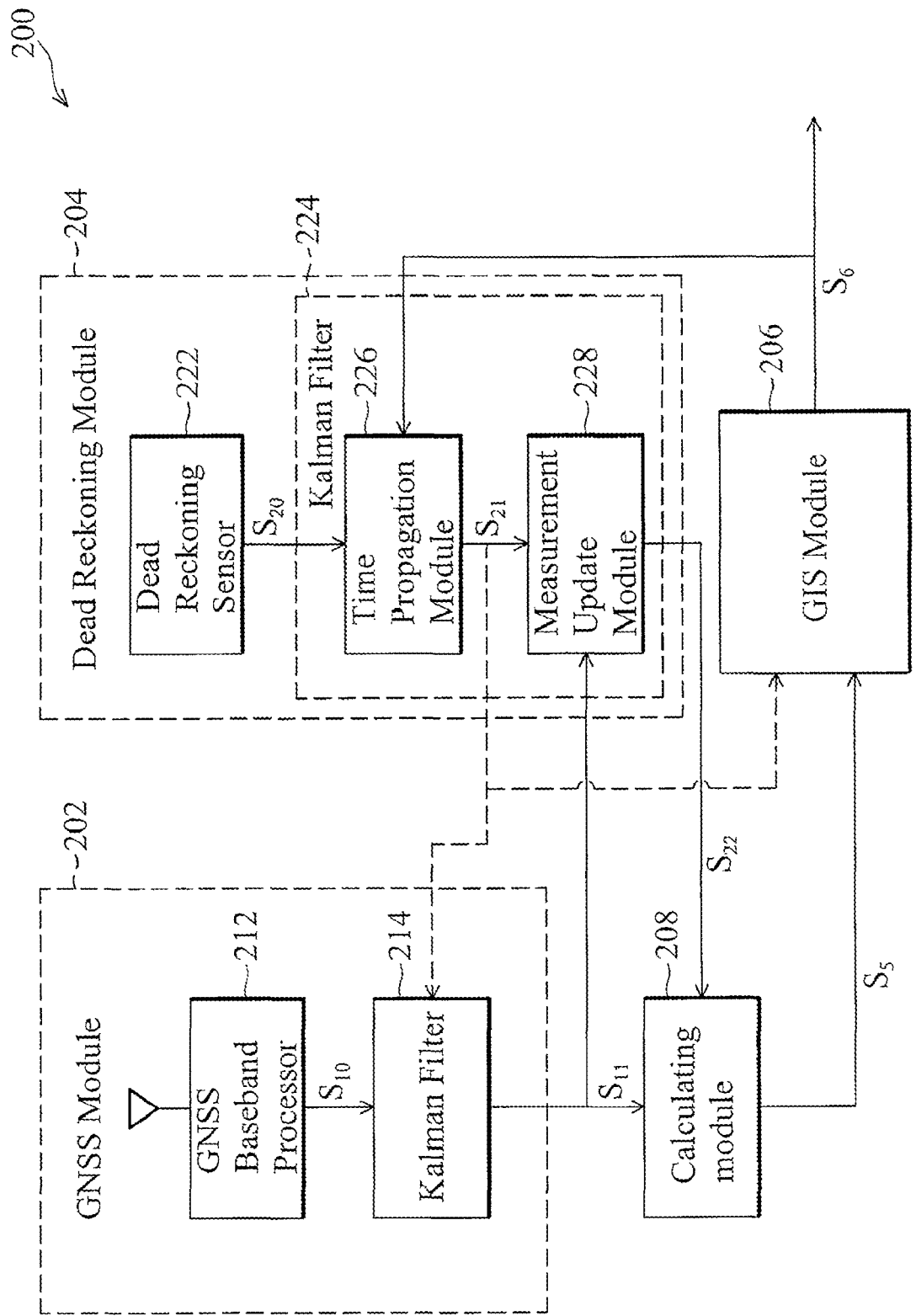
FIG. 2 is a block diagram of another positioning system of a loosely-coupled mode according to the invention.

FIG. 2 is a block diagram of another positioning system 200 according to the invention. Similar to the positioning system 100, the positioning system 200 comprises a GNSS module 202, a dead reckoning module 204, an calculating module 208, and a GIS module 206. The GNSS module 202 is similar to the GNSS module 102 of FIG. 1, comprising a GNSS baseband processor 212 and a Kalman filter 214, and generating a positioning data $S_{11}$. The dead reckoning module 204 is similar to the dead reckoning module 104 of FIG. 1, comprising a dead reckoning sensor 222 and a Kalman filter 224, and generating a positioning data $S_{22}$.

The Kalman filter 224 of the dead reckoning module 204 comprises a time propagation module 226 and a measurement update module 228. The time propagation module 226 estimates a positioning data $S_{21,T}$ of a current time T according to a feedback positioning data $S_{6,T-1}$ of a previous time (T−1) and a measurement data $S_{20,T}$ of the current time T. The measurement update module 228 then estimates a positioning data $S_{22,T}$ of the current time T according to the positioning data $S_{21,T}$ of the current time T and the positioning data $S_{11,T}$ of the current time T.

Different from the positioning system 100 of FIG. 1, the calculating module 208 directly integrates the positioning data $S_{11}$ generated by the GNSS module 202 and the positioning data $S_{22}$ generated by the dead reckoning module 204 according to predetermined weights to obtain a positioning data $S_5$. The GIS module 206 then fits the positioning data $S_5$ generated by the calculating module 208 to a map data stored therein to generate a positioning data $S_6$, which is the final output of the positioning system 200. The positioning data $S_6$ is then fed back to the time propagation module 226 of the Kalman filter 224 of the dead reckoning module 204 for estimation of a next epoch.

The quality of satellite communication of the GNSS module 202 determines whether available positioning data $S_{11}$ is generated. If no available positioning data $S_{11}$ is generated, the GIS module 206 only receives the positioning data $S_{22}$ generated by the time propagation module 226 of the dead reckoning module 204 as an input and fits the positioning data $S_{22}$ to a map data to generate the positioning data $S_6$ as the final output of the positioning system 200. In addition, if the Kalman filter 214 of the GNSS module 202 receives the positioning data $S_{22}$ generated by the time propagation module 226 of the dead reckoning module 204 as an input, the Kalman filter 214 can still generate an available positioning data $S_{11}$ only according to the positioning data $S_{21}$ when the GNSS baseband processor 212 generates no available measurement data $S_{10}$ due to poor satellite communication. In the situation, the calculating module 208 then directly outputs the positioning data $S_{11}$ as the positioning data $S_5$, and the GIS module 206 then fits the positioning data $S_5$ to a map data to generate the positioning data $S_6$ as the final output of the positioning system 200.

Figure 3:
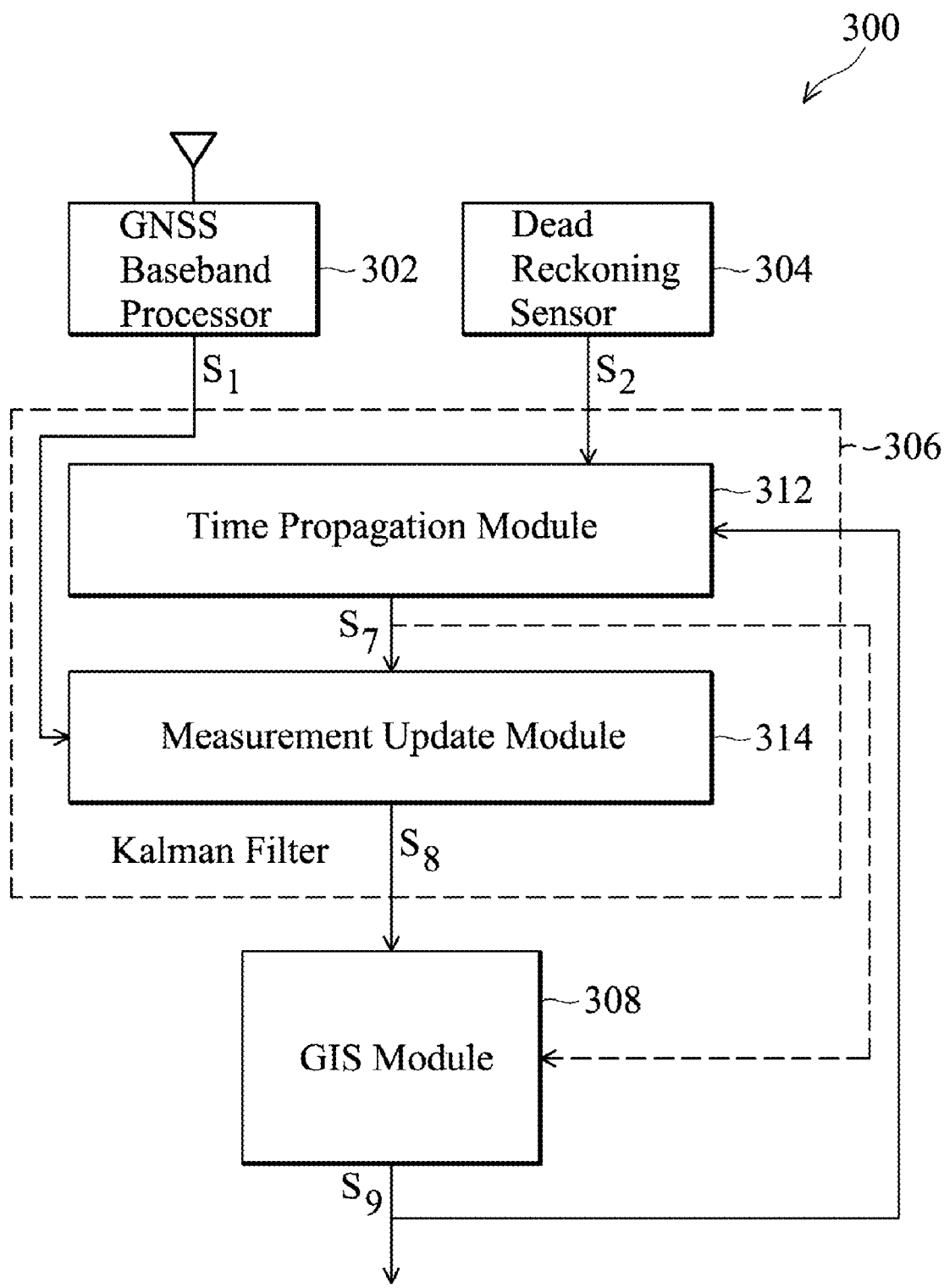
FIG. 3 is a block diagram of a positioning system 300 of a tightly-coupled mode according to the invention.

FIGS. 1 and 2 shows positioning systems 100 and 200 categorized as a loosely coupled mode because the implementations involve two Kalman filters and each individual Kalman filter has its own specific parameters related ti specific inputs and also some common parameters. FIG. 3 is a block diagram of a positioning system 300 categorized as a tightly coupled mode since only one Kalman filter is used and its state vector contains the parameters from GNSS and DR sensors according to the invention. The positioning system 300 comprises a GNSS baseband processor 302, a dead reckoning sensor 304, a Kalman filter 306, and a GIS module 308. The GNSS baseband processor 302 generates a GNSS measurement data $S_1$ according to satellite communication. The dead reckoning sensor 304 detects measurement thereof to generate a sensor's measurement data $S_2$. The Kalman filter 306 then estimates a positioning data $S_8$ according to the GNSS measurement data $S_1$, the sensor's measurement data $S_2$, and a feedback positioning data $S_9$ of a previous epoch. The GIS module 308 then fits the positioning data $S_8$ to a map data stored therein to generate the positioning data $S_9$ of a current epoch, which is the final output of the positioning system 300. The positioning data $S_9$ is then recursively fed back to the Kalman filter 306 for estimation of a next epoch.

The Kalman filter 306 comprises a time propagation module 312 and a measurement update module 314. The time propagation module 312 first estimates a positioning data $S_7$ of a current epoch according to the GNSS measurement data $S_1$ of the current epoch, the sensor's measurement data $S_2$ of the current epoch, and the feedback positioning data $S_9$ of a previous epoch. The measurement update module 314 then estimates the positioning data $S_8$ of the current epoch according to the positioning data $S_7$ of the current epoch. The measurement update module 314 is enabled only when the GNSS baseband processor 302 generates an available measurement data $S_1$. When the GNSS baseband processor 302 fails due to poor satellite communication, the measurement update module 314 is disabled, and the GIS module 308 receives the positioning data $S_7$ generated by the time propagation module 312 instead of the positioning data $S_8$ as an input to generate the final positioning data $S_9$. Thus, the positioning system 300 can still generate a positioning data $S_9$ while the GNSS baseband processor 302 fails.

Figure 4:
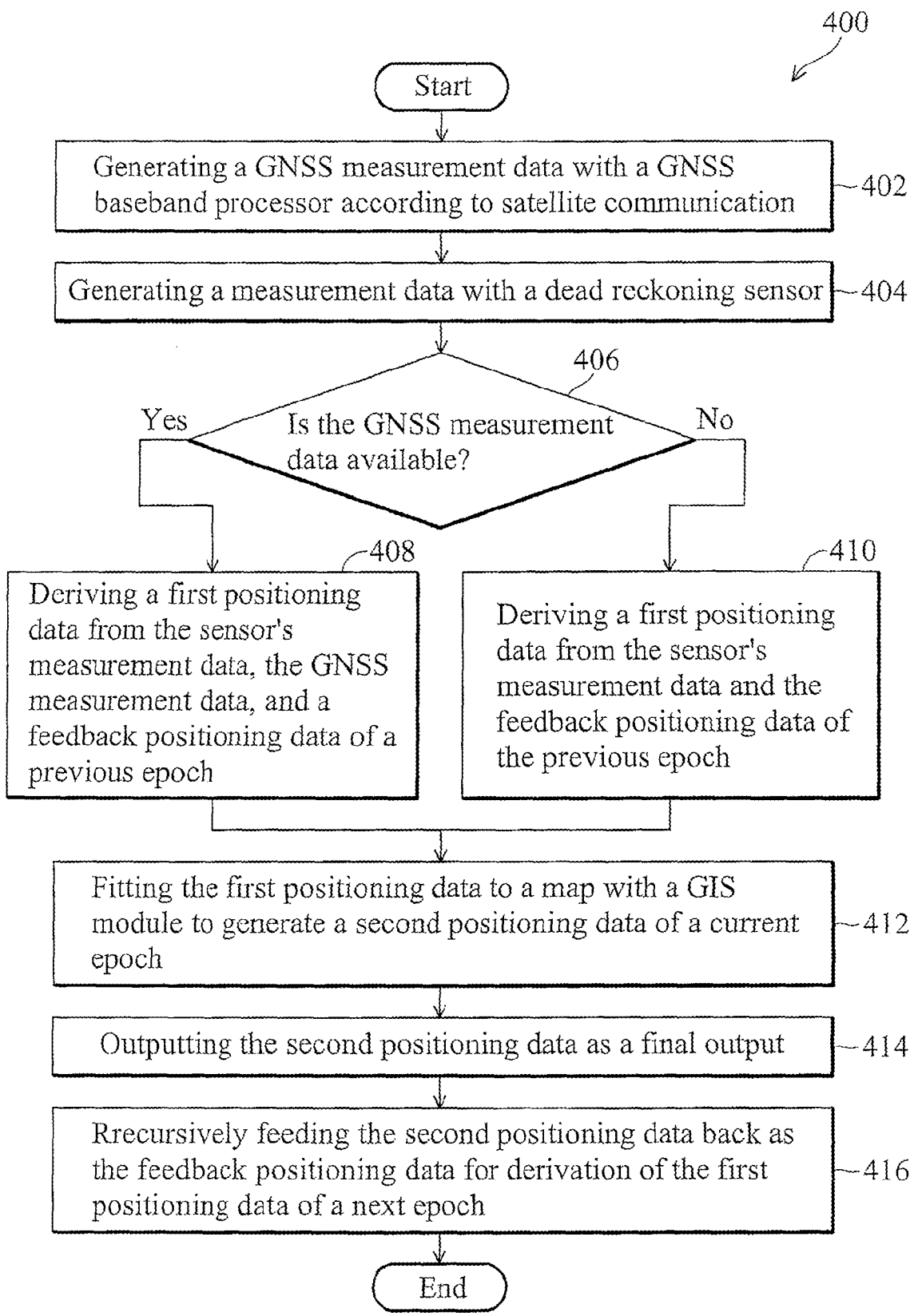
FIG. 4 is a flowchart of a method of positioning according to the invention.

FIG. 4 is a flowchart of a method 400 of positioning according to the invention. First, a GNSS measurement data is generated with a GNSS baseband processor according to satellite communication in step 402. A measurement data is simultaneously generated with a dead reckoning sensor in step 404. If the GNSS measurement data is available in step 406, a first positioning data is derived from the sensor's measurement data, the GNSS measurement data, and a feedback positioning data of a previous epoch in step 408. In the embodiment of FIG. 3, the first positioning data is derived by a single Kaliman filter 306. In the embodiment of FIG. 2, a third positioning data $S_{11}$ is estimated according to the GNSS measurement data with a first Kalman filter 214, and a fourth positioning data $S_{22}$ is estimated according to the sensor's measurement data and the feedback positioning data of the previous epoch with a second Kalman filter 224, and the first positioning data $S_5$ is then derived from the third positioning data $S_{11}$ and the fourth positioning data $S_{22}$ according to predetermined weights.

Otherwise, if the GNSS measurement data is unavailable in step 406, the first positioning data is derived from the sensor's measurement data and the feedback positioning data of the previous epoch in step 410. The first positioning data is then fitted to a map with a GIS module to generate a second positioning data of a current epoch in step 412. The second positioning data is output as a final output in step 414. Finally, the second positioning data is recursively fed back as the feedback positioning data for derivation of the first positioning data of a next epoch in step 416.

The invention provides a positioning system comprising a GNSS module, a dead reckoning module, and a GIS module. The positioning data generated by the GNSS module and the dead reckoning module are combined to generate a positioning data. In addition, the GIS module fits the positioning data to a map data to generate a final positioning data with higher precision. When the GNSS module fails due to poor satellite communication, the dead reckoning module can still generate a measurement data. Because the final positioning data adjusted by the GIS module has a higher precision and is fed back as a basis of a next estimation, the estimation error of the dead reckoning module is reduced, and the final positioning data is more precise and therefore DR time lasts longer in relative to the system without GIS aided.

While the invention has been described by way of example and in terms of preferred embodiment, it is to be understood that the invention is not limited thereto. To the contrary, it is intended to cover various modifications and similar arrangements (as would be apparent to those skilled in the art).

Therefore, the scope of the appended claims should be accorded the broadest interpretation so as to encompass all such modifications and similar arrangements.

What is claimed is:

1. A positioning system, comprising:
 a Global Navigation Satellite System (GNSS) module, generating a first positioning data according to satellite communication;
 a dead reckoning module, estimating a second positioning data according to a measurement data, the first positioning data, and a feedback positioning data of a previous epoch;
 a calculating module, deriving a third positioning data from the first positioning data and the second positioning data according to predetermined weights; and
 a GIS module, fitting the third positioning data to a map to generate the feedback positioning data of a current epoch, which is taken as a final output of the positioning system and recursively fed back to the dead reckoning module for a next estimation.

2. The positioning system as claimed in claim 1, wherein the GNSS module further comprises:
 a GNSS baseband processor, generating a GNSS measurement data according to satellite communication; and
 a first Kalman filter, coupled to the GNSS baseband processor, generating the first positioning data according to the GNSS measurement data.

3. The positioning system as claimed in claim 1, wherein the dead reckoning module further comprises:
 a dead reckoning sensor, generating the measurement data of the current epoch; and
 a second Kalman filter, coupled to the dead reckoning sensor, comprising:
  a time propagation module, estimating a fourth positioning data of the current epoch according to the feedback positioning data of the previous epoch and the measurement data of the current epoch; and
  a measurement update module, estimating the second positioning data of the current epoch according to the fourth positioning data of the current epoch and the first positioning data of the current epoch.

4. The positioning system as claimed in claim 3, wherein the GIS module generates the feedback positioning data according to the fourth positioning data when the first positioning data is unavailable and the third positioning data is erroneous.

5. The positioning system as claimed in claim 3, wherein the GNSS module comprises a first Kalman filter generating the first positioning data according to the fourth positioning data and a GNSS measurement data generated by a GNSS baseband processor.

6. The positioning system as claimed in claim 5, wherein the first Kalman filter generates the first positioning data according to only the fourth positioning data and the calculating module directly outputs the first positioning data as the third positioning data when the GNSS measurement data is unavailable.

7. The positioning system as claimed in claim 1, wherein the first positioning data comprises a position data, a velocity data, and a time data.

8. The positioning system as claimed in claim 3, wherein the dead reckoning sensor is the integration of at least a linear movement sensor measuring a linear movement to generate the measurement data and an angular movement sensor measuring an angular movement to generate the measurement data.

* * * * *